United States Patent [19]

Gant

[11] 4,335,344
[45] Jun. 15, 1982

[54] VOLTAGE REGULATOR FOR A CONTROLLED FIELD GENERATOR

[76] Inventor: Leroy A. Gant, 521 Jasmine La., Santa Maria, Calif. 93454

[21] Appl. No.: 183,184

[22] Filed: Sep. 2, 1980

[51] Int. Cl.³ .................................. H02J 7/14
[52] U.S. Cl. .................................. 322/25; 322/28; 322/73; 320/64; 320/32
[58] Field of Search ............... 322/25, 28, 73; 320/64, 320/68, 48

[56] References Cited

U.S. PATENT DOCUMENTS 3,663,946  5/1972  Iwaki ........................... 322/25 X
4,247,813  1/1981  Gansert et al. ................. 320/48

Primary Examiner—Robert J. Hickey
Attorney, Agent, or Firm—Phillips, Moore, Lempio & Majestic

[57] ABSTRACT

A voltage regulator which regulates field current through a controlled field generator used to charge a battery, including a battery voltage sensing circuit which generates logic control signals in response to the battery voltage being above or below a predetermined level, an over-current sensing circuit which generates logic control signals in response to the charging current of the generator being above or below a predetermined level of charging current, a logic gate for gating the logic control signals, and a control circuit responsive to the signals from the logic gate to continue or interrupt field current through the field winding.

7 Claims, 3 Drawing Figures

FIG_1

FIG_2

VOLTAGE REGULATOR FOR A CONTROLLED FIELD GENERATOR

BACKGROUND OF THE INVENTION

This invention relates to voltage regulators and, more particularly, to a voltage regulator for regulating the supply of power by a controlled field generator used to charge an electrical storage device such as a storage battery.

A voltage regulator is commonly used in an electrical system of a vehicle having a controlled field generator for charging the vehicle battery and for supplying power to system loads. The controlled field generator can be either a D.C. generator or an A.C. generator. The voltage regulator controls or regulates the charging of the battery by the generator in response to the battery voltage. When the battery voltage exceeds a predetermined level, which is the design or operating voltage of the battery, the voltage regulator inhibits the generator from further charging the battery, whereas when the battery voltage falls below this predetermined level, the voltage regulator enables further charging of the battery by the generator to increase the battery voltage.

To accomplish this control, the voltage regulator has a circuit that turns on and off the field current to the controlled field winding of the generator. When the battery is fully charged to the operating voltage, the field current is turned off, whereas when the battery voltage is below the operating level the field current is turned on to charge the battery via the output of the generator. Prior voltage regulators disadvantageously use a linear or analog control circuit to turn the field current on and off. As a result of this linear operation, highly precise control is difficult to obtain and the control circuit is relatively complex. Such a linear control circuit also does not have the highest reliability and is expensive.

Furthermore, excessive load current can damage the generator. It is therefore desirable to protect the generator when such excessive load current occurs.

SUMMARY OF THE INVENTION

It is an object of the present invention to provide a novel voltage regulator for regulating controlled field generators.

Another object of the present invention is to provide such a voltage regulator which has more precise control, is less expensive and is more reliable than prior regulators.

Yet another object of the present invention is to provide a voltage regulator having very simple control circuits.

Still a further object of the present invention is to protect the generators against excessive load current.

The above and other objects of the present invention are obtained through use of a voltage regulator for regulating a controlled field generator, having a field winding, which generates current to charge an electrical storage device, including means for sensing the voltage of the electrical storage device and for generating a first or second logic control signal in response to the voltage of the storage device being above or below a predetermined level, including means for generating a first reference voltage representing the predetermined level of storage device voltage, means for generating a second voltage proportional to the storage device voltage, and a first comparator for comparing the first reference voltage and the second proportional voltage and for producing the first logic control signal of one value in response to the second proportional voltage exceeding the first reference voltage and for producing the second logic control signal of another value in response to the first reference voltage exceeding the second proportional voltage.

Also included in the voltage regulator is a means for sensing charging current produced by the controlled field generator and for generating a third or fourth logic control signal in response to the charging current being above or below a predetermined level, including means for generating a third reference voltage representing a predetermined level of charging current, means for generating a fourth voltage proportional to the charging current, and a second comparator for comparing the third reference voltage and the fourth proportional voltage and for producing the third logic control signal of one value in response to the fourth proportional voltage exceeding the third reference voltage and for producing the fourth logic control signal of another value in response to the third reference voltage exceeding the fourth proportional voltage.

In addition, the voltage regulator includes a control path having a transistor for controlling energization and deenergization of the field winding, and a logic gate having an output for turning the transistor on or off in response to the first or second logic control signal received from the first comparator and for turning the transistor on or off in response to the third or fourth logic control signal received from the second comparator.

DETAILED DESCRIPTION OF THE INVENTION

Figure 1:
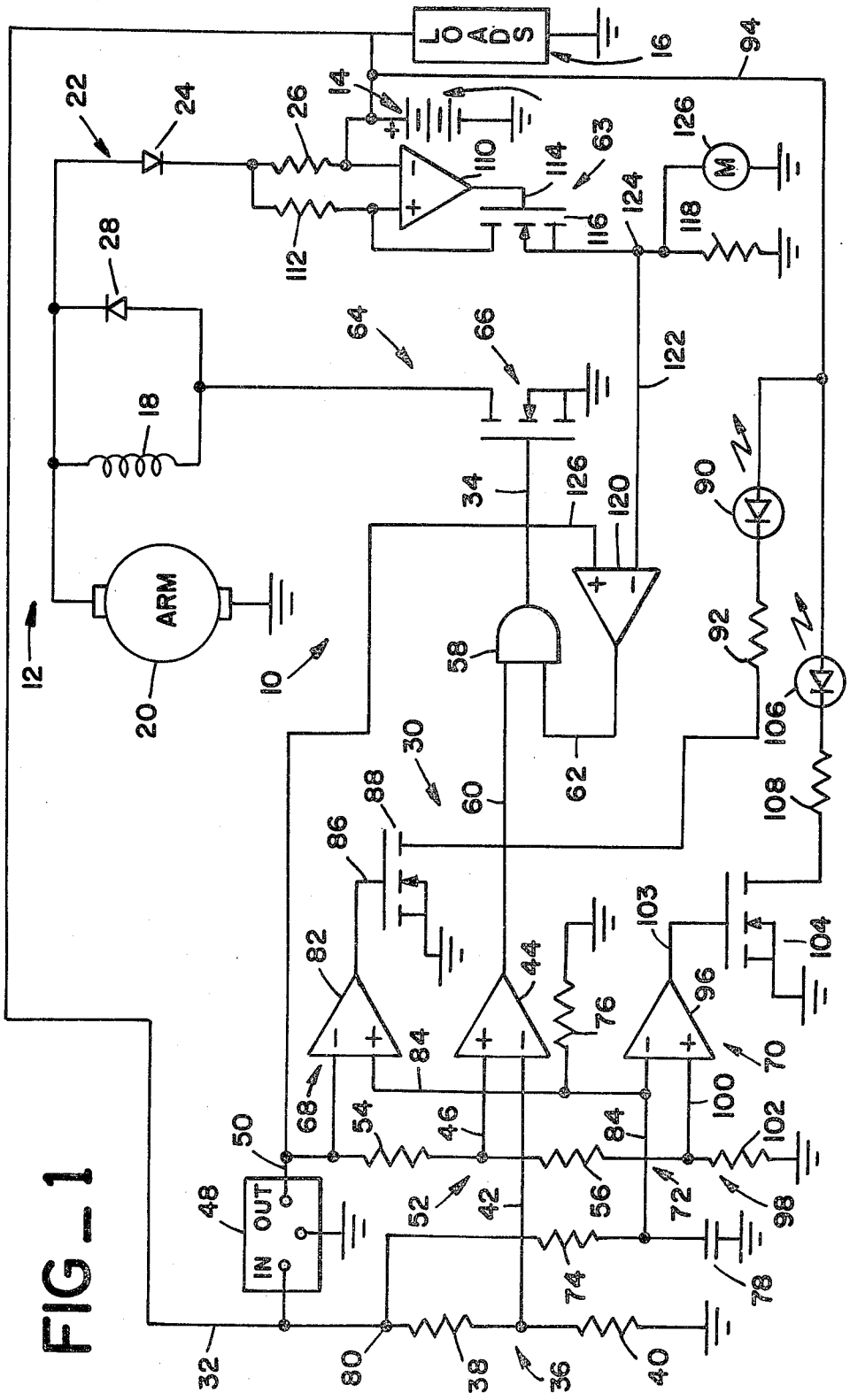
FIG. 1 is a schematic illustration of one embodiment of the present invention applied to a shunt-wound, self-excited, D.C. generator.

FIG. 1 shows a voltage regulator 10 which can be connected between a shunt-wound, self-excited, D.C. generator 12 and an electrical storage device such as a vehicle battery 14, as well as various electrical system loads 16. The generator 12 has a controlled field winding 18 and an armature winding 20 whose output is used to charge the battery 14 over a current charging path 22 having a diode 24 and a current sensing resistor 26. Diode 24 prevents current flow from the battery 14 back through the armature 20 when there is no output from the generator 12. The purpose of current sensing resistor 26 will be described below.

A diode 28, known as a free wheeling diode, provides a discharge path for the energy stored in the field winding 18 when field current is turned off by the voltage regulator 10, as will be described. At such a time, diode 28 becomes forward biased so that the discharge path is completed from one side of the field winding 18, through the diode 28, to the other side of the field winding 18.

Voltage regulator 10 has a circuit 30 which senses the voltage of the battery 14 via an input line 32, connected to the positive terminal of battery 14, to produce control signals on an output line 34. Circuit 30 includes a voltage divider 36 having a resistor 38 and a resistor 40 coupled to the line 32. Voltage divider 36 produces an output voltage on a line 42 which is proportional to the voltage of battery 14. A comparator 44, such as an operational amplifier, has its negative terminal connected to the line 42 and its positive terminal connected over a line 46 to receive a reference voltage which is proportional to a predetermined level or design operating voltage of battery 14. A reference voltage generator 48 is connected to the line 32 to produce a precise voltage, e.g., 5 volts, on an output line 50, which is divided by a voltage divider 52 having a resistor 54 and a resistor 56 to produce the particular reference voltage on line 46.

An AND gate 58 has one input coupled to the output of comparator 44 over a line 60 and an output coupled to the line 34. Gate 58 has another input coupled to a line 62 which carries the output of an over-current protection circuit 63 to be described below. If the signal on line 62 is assumed to be a logic 1, when the reference voltage on line 46 exceeds the voltage on line 42 proportional to the battery voltage, comparator 44 produces a signal of one value on line 60, i.e., a logic 1. Gate 58 gates this logic 1 onto line 34 as one control signal. When the voltage on line 42 exceeds the reference voltage on line 46, comparator 44 produces a signal of another value on line 60, i.e., a logic 0. Gate 58 is then disabled and produces a logic 0 on line 34 as another control signal.

A control circuit 64 responds to the control signals on line 34 to turn on and off the flow of field current through the field winding 18. Control circuit 64 includes a transistor 66 which is turned on and off in response to the control signals on line 34. Transistor 66 can be either a field effect device or a bi-polar device. When transistor 66 is turned on, field current will flow through winding 18, whereas when transistor 66 is turned off, field current will not flow through the winding 18.

In the operation of the above portion of voltage regulator 10, assume that battery 14 is not fully charged to its operating voltage and that armature 20 is generating current on the charging path 22. Therefore, the voltage of battery 14 is below the above-mentioned predetermined level corresponding to the fully charged state of battery 14. As a result, the reference voltage on line 46 is greater than the voltage in line 42 which is proportional to the battery voltage. Comparator 44 thus produces a logic 1 signal on line 60 which is gated through gate 58 onto line 34. This assumes that the signal on line 62 also is at logic 1. Accordingly, transistor 66 is turned on to continue field current flow through the field winding 18 and transistor 66 to ground.

Now assume that the battery 14 has been charged to the predetermined voltage level. At this time, the voltage on line 42 is greater than the reference voltage on line 46 so that comparator 44 now produces a logic 0 on line 60. Consequently, gate 58 is disabled to produce a logic 0 on line 34 which turns off transistor 66. Now, the energy stored in field winding 18 provides a decaying field current through diode 28 so that the output of the generator 12 drops to zero and charging of the battery 14 is discontinued or interrupted until the battery voltage again falls below the predetermined level.

Voltage regulator 10 also has a circuit 68 for indicating an over-voltage condition of the battery 14 and a circuit 70 for indicating an under-voltage condition of the battery 14. A voltage divider and filtering network 72 of circuit 68 and circuit 70, which includes a resistor 74, a resistor 76 and a filtering capacitor 78, has an input connected to the line 32 via a junction 80. A comparator 82, such as an operational amplifier, has its positive terminal connected to the output voltage of network 72 over a line 84 and its negative terminal coupled to the line 50 receiving the reference voltage of +5 volts. Comparator 82 has an output coupled to a line 86 for controlling the on-off state of a transistor 88. A light emitting diode 90 and a current limiting resistor 92 are connected in series with transistor 88 to the positive terminal of battery 14 over a line 94.

A comparator 96 of circuit 70, such as an operational amplifier, has its negative terminal connected to the line 84 and its positive terminal connected to the output of a voltage divider 98 over a line 100, the divider 98 including the resistor 56 and a resistor 102. Comparator 96 has an output coupled to a line 103 for turning on and off a transistor 104. A light emitting diode 106 and a current limiting resistor 108 are connected in series with the transistor 104 to the positive terminal of battery 14 over the line 94. Transistor 88 and transistor 104 can be either a field effect device or a bi-polar device.

In the operation of circuit 68, when the battery 14 has been charged to an over-voltage condition, the voltage on line 84 will exceed the reference voltage on line 50 so that comparator 82 produces a logic 1 on line 86 to turn on transistor 88. Accordingly, a circuit is completed from battery 14 through line 94, diode 90, resistor 92 and transistor 88 to energize the diode 90, thereby indicating this condition. When the battery 14 is not charged to an over-voltage condition, the voltage on line 50 exceeds the voltage on line 84 so that comparator 82 produces a logic 0 on line 86 to turn off transistor 88 and, thereby, deenergize diode 90.

In the operation of circuit 70, should the voltage of battery 14 drop to an under-voltage condition, the reference voltage on line 100 will exceed the voltage on line 84 so that comparator 96 produces a logic 1 on line 103 to turn on transistor 104. Accordingly, diode 106 is energized through the closed path including line 94, diode 106, resistor 108 and transistor 104. When the battery voltage exceeds this under-voltage condition, the voltage on line 84 will exceed the voltage on line 100 so that comparator 96 produces a logic 0 on line 103, thereby turning off transistor 104 and deenergizing diode 106.

The over-current protection circuit 63 of voltage regulator 10 includes a linear, differential amplifier 110 having its negative terminal receiving a voltage signal from the current sensing resistor 26 and its positive terminal receiving a voltage signal from a resistor 112. Amplifier 110 has an output connected to a line 114 for controlling the conduction of a transistor 116 which is connected in series with a resistor 118 between the positive terminal of amplifier 110 and ground. Transistor 116 can be either a field effect device or a bi-polar device.

A comparator 120, such as an operational amplifier, has its negative terminal connected over a line 122 to a junction 124 between transistor 116 and resistor 118. Line 122 develops a voltage, when current flows through resistor 118, that is proportional to the generator current sensed by resistor 26. Comparator 120 has its positive terminal 126 connected to the line 50 carrying the reference signal of +5 volts. The output of comparator 120 is produced on the line 62.

In the operation of circuit 63, as armature current from armature 20 flows through current sensing resistor 26, and resistor 112, a differential voltage will appear at the inputs of amplifier 110. As the generator current flows through resistor 26, and increases to an over-current condition, the output of amplifier 110 increases the conduction through transistor 116. Accordingly, current through resistor 112 is diverted from the positive terminal of amplifier 110 through transistor 116 and resistor 118 to ground to maintain the differential input to amplifier 110 at zero volts. As a result, the voltage signal that is now produced on line 122 is greater than the reference voltage on line 126 so that comparator 120 produces a logic 0 on line 62 which disables gate 58 to turn off transistor 66. Consequently, as described previously, when transistor 66 is turned off, the field current through field winding 18 is interrupted and the output of armature 20 drops toward zero.

Then, the differential voltage at the inputs of amplifier 110 will be at a level such that the output on line 114 will decrease to turn off transistor 116. Consequently, the reference voltage on line 126 will exceed the voltage on line 122 so that comparator 120 produces a logic 1 on line 62 which enables gate 58 to turn on transistor 66 and continue flow of field current through winding 18.

A scaled, digital voltmeter 126 is connected across resistor 118 and ground to monitor the charging current of generator 12.

Figure 2:
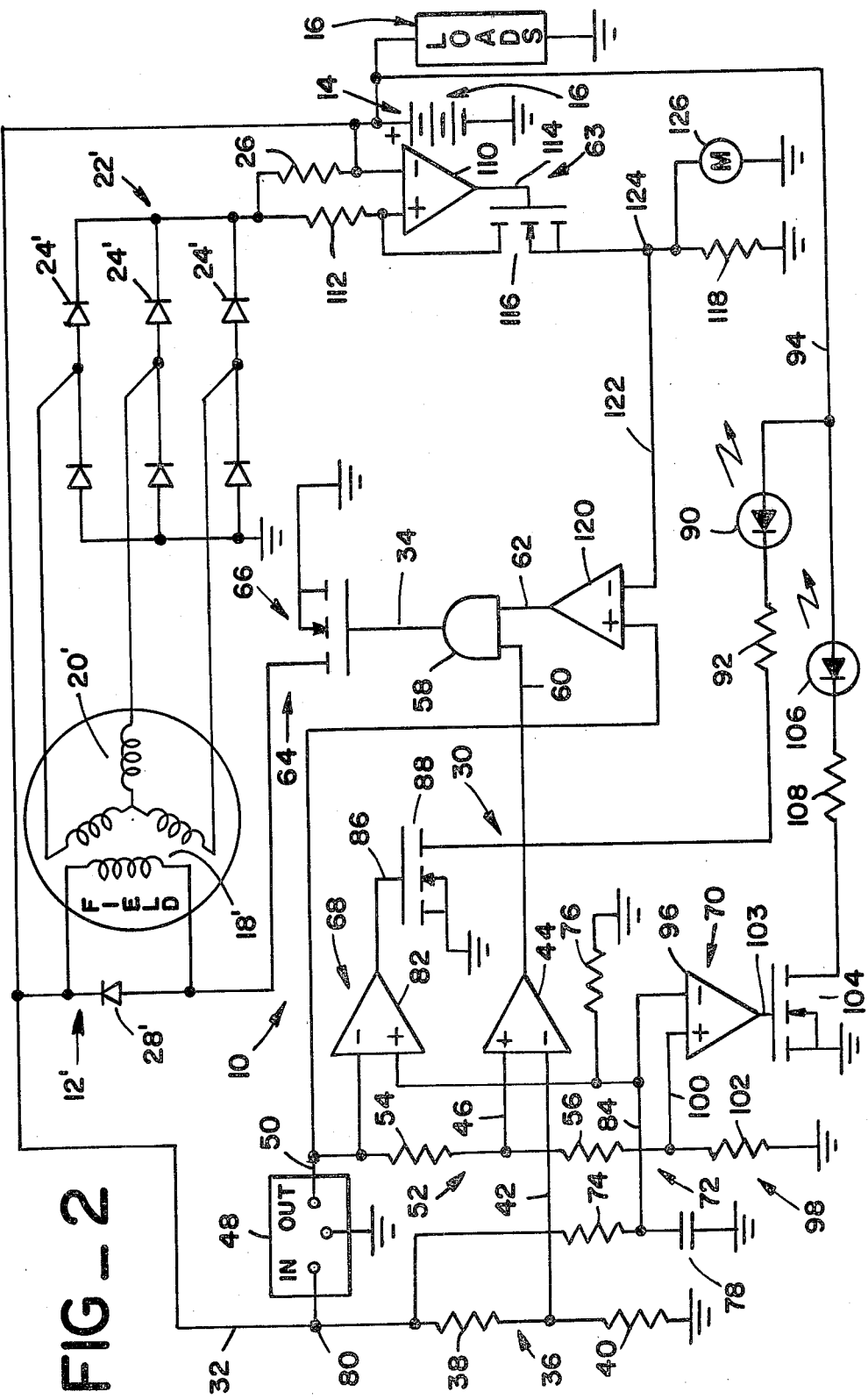
FIG. 2 is a schematic illustration of the same embodiment of FIG. 1, but applied to a controlled field A.C. generator.

FIG. 2 shows the same voltage regulator 10 as in FIG. 1, but illustrates its application to a 3-phase, controlled field A.C. generator. Like reference numerals are used in FIG. 1 and FIG. 2 to indicate identical or similar elements. Thus, generator 12' of FIG. 2 has a field winding 18' and stator winding 20' to charge battery 14 via a path 22'. Since voltage regulator 10 of FIG. 2 is the same as voltage regulator 10 of FIG. 1, reference can be made to the above description to understand the control produced by the former. Briefly, as shown in FIG. 2, the control signals on line 34 turn on and off the transistor 66 to continue or to interrupt the flow of field current through the field winding 18'.

Figure 3:
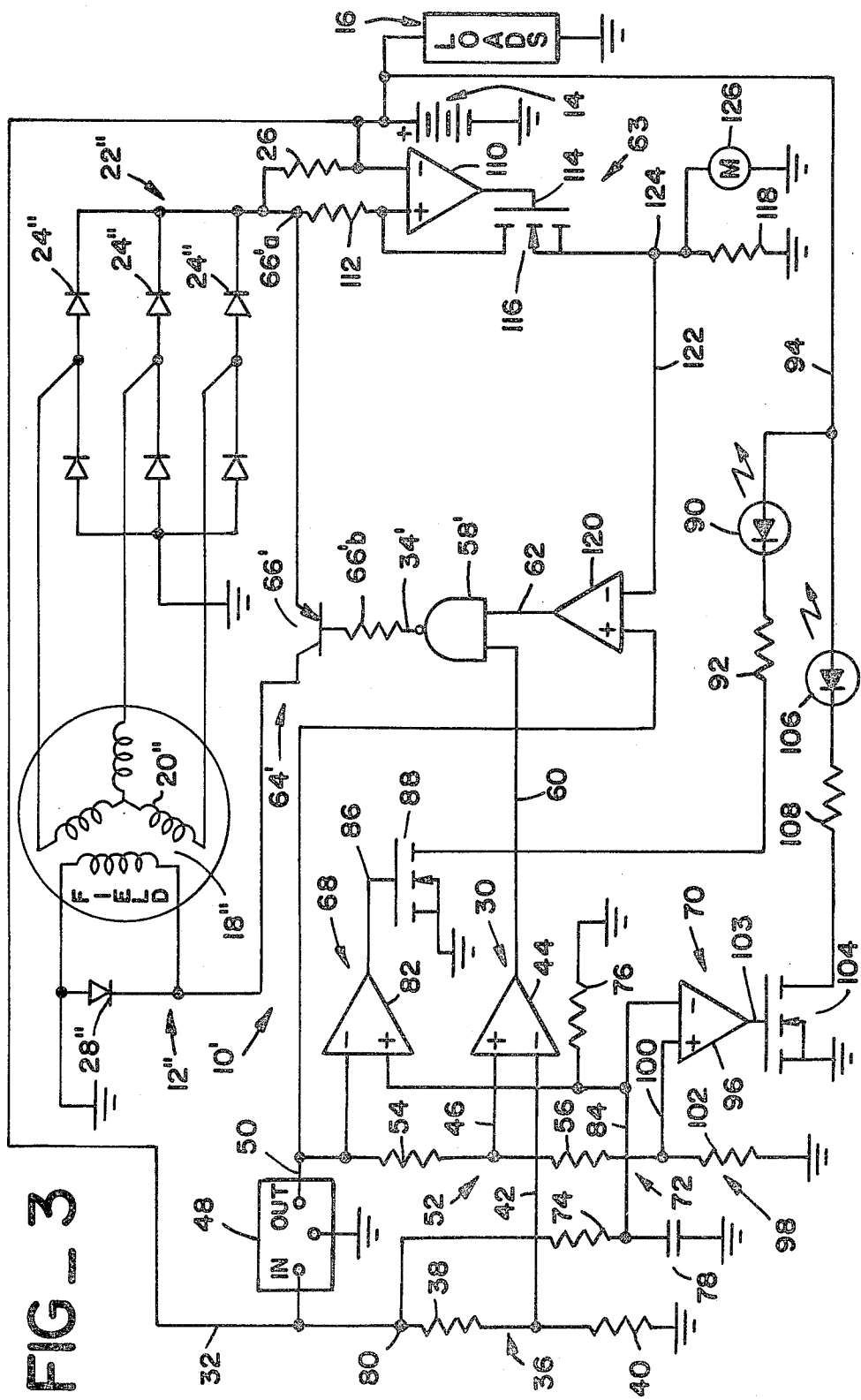
FIG. 3 shows schematically another embodiment of the present invention applied to a different type of controlled field A.C. generator.

FIG. 3 shows a voltage regulator 10' that is similar to the voltage regulator 10 of FIG. 1 and FIG. 2, but is used with a controlled field A.C. generator 12" having a field winding 18" that is internally connected at one end to ground. Again, like reference numerals are used to show like elements in FIGS. 1-3. The voltage regulator 10' includes a NAND gate 58' in place of the AND gate 58 and a control circuit 64' in place of the control circuit 64. Control circuit 64' has a transistor 66' whose emitter is connected to a junction 66a', a collector connected to one end of the field winding 18" and a base having a current limiting resistor 66'b. When the control signal on line 60 or line 62 is a logic 0, gate 58' produces a logic 1 to turn off the transistor 66' and thereby interrupt the field current flowing through the field winding 18". When control signals on line 60 and line 62 are a logic 1, the gate 58' produces a logic 0 on line 34' to turn on the transistor 66', resulting in field current flowing through the field winding 18".

In summary, the voltage regulator 10 and voltage regulator 10' provide precise and reliable control by means of the digital control signals that are generated and that are used to turn on and off the various transistors. Also, the various logic components of regulator 10 and regulator 10' provide for relatively simple and inexpensive control circuits.

Other aspects, objects and advantages of this invention can be obtained from a study of the drawings, disclosure and the appended claims.

I claim:

1. A voltage regulator for regulating a controlled field generator which generates current to charge an electrical storage device, the generator having a field winding, comprising:
   (a) means for sensing the voltage of the electrical storage device and for generating a first or second logic control signal in response to the voltage of the electrical storage device being above or below a predetermined level, respectively, including
      (i) means for generating a first reference voltage representing the predetermined level of voltage of the electrical storage device,
      (ii) means for generating a second voltage proportional to the voltage of the electrical storage device, and
      (iii) a first comparator for comparing the first reference voltage and the second proportional voltage and for producing the first logic control signal of one value in response to the second proportional voltage exceeding the first reference voltage and for producing the second logic control signal of another value in response to the first reference voltage exceeding the second proportional voltage;
   (b) means for sensing charging current produced by the controlled field generator and for generating a third or fourth logic control signal in response to the charging current being above or below a predetermined level, including
      (i) means for generating a third reference voltage representing the predetermined level of charging current,
      (ii) means for generating a fourth voltage proportional to the charging current, and
      (iii) a second comparator for comparing the third reference voltage and the fourth proportional voltage and for producing the third logic control signal of one value in response to the fourth proportional voltage exceeding the third reference voltage and for producing the fourth logic control signal of another value in response to the third reference voltage exceeding the fourth proportional voltage;
   (c) a control path having a transistor for controlling energization and deenergization of the field winding; and
   (d) an AND gate having first and second inputs connected, respectively, to said first comparator and said second comparator, and an output connected to said transistor to control turning on and off said transistor.

2. A voltage regulator according to claim 1 further comprising means for indicating an over-voltage condition of the electrical storage device.

3. A voltage regulator according to claim 2 further comprising means for indicating an under-voltage condition of the electrical storage device.

4. A voltage regulator for regulating a controlled field generator which generates current to charge an electrical storage device, the generator having a field winding, comprising:

(a) means for sensing the voltage of the electrical storage device and for generating a first or second logic control signal in response to the voltage of the electrical storage device being above or below a predetermined level, respectively, including
  (i) means for generating a first reference voltage representing the predetermined level of voltage of the electrical storage device,
  (ii) means for generating a second voltage proportional to the voltage of the electrical storage device, and
  (iii) a first comparator for comparing the first reference voltage and the second proportional voltage and for producing the first logic control signal of one value in response to the second proportional voltage exceeding the first reference voltage and for producing the second logic control signal of another value in response to the first reference voltage exceeding the second proportional voltage;
(b) means for sensing charging current produced by the controlled field generator and for generating a third or fourth logic control signal in response to the charging current being above or below a predetermined level, including
  (i) means for generating a third reference voltage representing the predetermined level of charging current,
  (ii) means for generating a fourth voltage proportional to the charging current, and
  (iii) a second comparator for comparing the third reference voltage and the fourth proportional voltage and for producing the third logic control signal of one value in response to the fourth proportional voltage exceeding the third reference voltage and for producing the fourth logic control signal of another value in response to the third reference voltage exceeding the fourth proportional voltage;
(c) a control path having a transistor for controlling energization and deenergization of the field winding; and
(d) a NAND gate having first and second inputs connected, respectively, to said first comparator and said second comparator, and an output connected to said transistor to control turning on and off said transistor.

5. A voltage regulator according to claim 4 further comprising means for indicating an over-voltage condition of the electrical storage device.

6. A voltage regulator according to claim 3 further comprising means for indicating an under-voltage condition of the electrical storage device.

7. A voltage regulator for regulating a controlled field generator which generates current to charge an electrical storage device, the generator having a field winding, comprising:
(a) means for sensing the voltage of the electrical storage device and for generating a first or second logic control signal in response to the voltage of the electrical storage device being above or below a predetermined level, respectively, including
  (i) means for generating a first reference voltage representing the predetermined level of voltage of the electrical storage device,
  (ii) means for generating a second voltage proportional to the voltage of the electrical storage device, and
  (iii) a first comparator for comparing the first reference voltage and the second proportional voltage and for producing the first logic control signal of one value in response to the second proportional voltage exceeding the first reference voltage and for producing the second logic control signal of another value in response to the first reference voltage exceeding the second proportional voltage;
(b) means for sensing charging current produced by the controlled field generator and for generating a third or fourth logic control signal in response to the charging current being above or below a predetermined level, including
  (i) means for generating a third reference voltage representing the predetermined level of charging current,
  (ii) means for generating a fourth voltage proportional to the charging current, including a differential amplifier having a pair of input terminals for receiving a differential voltage and an output terminal, in which one of said input terminals is adapted to receive a voltage proportional to the charging current, and a control circuit having a transistor and a resistor in series connection with the other of said input terminals, said transistor having a control terminal connected to said output terminal of said differential amplifier; and
  (iii) a second comparator for comparing the third reference voltage and the fourth proportional voltage and for producing the third logic control signal of one value in response to the fourth proportional voltage exceeding the third reference voltage and for producing the fourth logic control signal of another value in response to the third reference voltage exceeding the fourth proportional voltage, said second comparator having an input terminal connected between said transistor of said control circuit and said resistor;
(c) a control path having a transistor for controlling energization and deenergization of the field winding; and
(d) a logic gate having first and second inputs connected, respectively, to said first comparator and said second comparator, and an output connected to said transistor of said control path to control turning on and off said transistor of said control path.

* * * * *